United States Patent
Shin et al.

(10) Patent No.: US 9,331,764 B2
(45) Date of Patent: May 3, 2016

(54) METHOD AND APPARATUS FOR ALIGNING INTERFERENCE USING A FEED FORWARD INDEX IN A HIERARCHICAL CELL COMMUNICATION SYSTEM

(75) Inventors: Won Jae Shin, Yongin (KR); Nam Yoon Lee, Seoul (KR); Won Jong Noh, Yongin (KR); Hyun Ho Choi, Suwon (KR); Chang Yong Shin, Seoul (KR); Kyung Hun Jang, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 570 days.

(21) Appl. No.: 13/113,875

(22) Filed: May 23, 2011

(65) Prior Publication Data

US 2012/0077511 A1   Mar. 29, 2012

(30) Foreign Application Priority Data

Sep. 27, 2010   (KR) .................. 10-2010-0093242

(51) Int. Cl.
  *H04W 72/00* (2009.01)
  *H04B 7/06* (2006.01)
  *H04B 7/02* (2006.01)
  *H04B 7/08* (2006.01)
  *H04W 16/32* (2009.01)

(52) U.S. Cl.
  CPC .............. *H04B 7/0617* (2013.01); *H04B 7/022* (2013.01); *H04B 7/0634* (2013.01); *H04B 7/0862* (2013.01); *H04W 16/32* (2013.01)

(58) Field of Classification Search
  CPC ................................................ H04W 64/00
  See application file for complete search history.

(56) References Cited

U.S. PATENT DOCUMENTS

| | | | | |
|---|---|---|---|---|
| 4,298,873 | A | * | 11/1981 | Roberts ......................... 342/375 |
| 2003/0012262 | A1 | * | 1/2003 | Ribeiro Dias et al. ......... 375/147 |
| 2006/0056531 | A1 | * | 3/2006 | Li .......................... H04B 7/0417 375/267 |
| 2006/0115015 | A1 | | 6/2006 | Oh et al. |
| 2008/0075037 | A1 | | 3/2008 | Guo et al. |
| 2009/0016460 | A1 | * | 1/2009 | Hwang et al. ................ 375/267 |

(Continued)

FOREIGN PATENT DOCUMENTS

| | | |
|---|---|---|
| KR | 10-2009-0079176 | 7/2009 |
| KR | 10-2010-0025942 | 3/2010 |

(Continued)

OTHER PUBLICATIONS

International Search Report and Written Opinion issued on Jan. 2, 2012, in corresponding International Patent Application No. PCT/KR2011/003956 (9 pages).

*Primary Examiner* — Justin Lee
(74) *Attorney, Agent, or Firm* — NSIP Law (57) ABSTRACT

Provided is an interference aligning method and apparatus that does not perform full feed-forwarding in a hierarchical cell communication. A macro base station may generate respective transmission beamforming vectors of macro terminals to null interference channels to pico terminals and to remove interference among the macro terminals. The effective interference channels are based on reception beamforming vectors of the pico terminals. The macro base station may transmit, to a macro terminal, a feed-forward indicator (FFI) indicating a method of transmitting information associated with a reception beamforming vector of the macro terminal. The macro terminal may obtain information associated with the reception beamforming vector based on the FFI.

18 Claims, 7 Drawing Sheets

(56) References Cited

U.S. PATENT DOCUMENTS

| | | |
|---|---|---|
| 2009/0019150 A1 | 1/2009 | Li et al. |
| 2009/0286562 A1* | 11/2009 | Gorokhov .................... 455/501 |
| 2009/0296650 A1 | 12/2009 | Venturino et al. |
| 2010/0035627 A1 | 2/2010 | Hou et al. |
| 2010/0056171 A1 | 3/2010 | Ramprashad et al. |
| 2010/0085917 A1* | 4/2010 | Gorokhov et al. ........... 370/328 |
| 2010/0124930 A1* | 5/2010 | Andrews et al. .............. 455/436 |
| 2011/0096755 A1* | 4/2011 | Clerckx et al. ............... 370/335 |

FOREIGN PATENT DOCUMENTS

| | | |
|---|---|---|
| KR | 10-2010-0027945 | 3/2010 |
| WO | WO 2009/088248 A2 | 7/2009 |

* cited by examiner

METHOD AND APPARATUS FOR ALIGNING INTERFERENCE USING A FEED FORWARD INDEX IN A HIERARCHICAL CELL COMMUNICATION SYSTEM

CROSS-REFERENCE TO RELATED APPLICATION(S)

This application claims the benefit under 35 U.S.C. §119(a) of Korean Patent Application No. 10-2010-0093242, filed on Sep. 27, 2010, in the Korean Intellectual Property Office, the entire disclosure of which is incorporated herein by reference for all purposes.

BACKGROUND

1. Field

The following description relates to a hierarchical cell communication system, and more particularly, to an interference aligning method and apparatus that do not need to perform feed-forwarding.

2. Description of Related Art

Recently, demands for wireless communication are rapidly increasing as a result of various wireless communication technologies and devices. The increase may lead to a lack of available frequency resources. Accordingly, there has been an increase for more effective use of the frequency resources.

A hierarchical cell environment is an environment in which a small cell formed by a small base station may be established in the form of a self organizing network within a macro cell. Examples of the small cell formed by the small base station include a relay cell, a femto cell, a picocell, a cell by home node-B (HNB), a cell by a home enhanced node-B (HeNB), a cell based on a remote radio head (RRH), and the like Although the hierarchical cell environment may increase the total system capacity, a user's quality of service (QoS) may be deteriorated because of interference, for example, interference between a macro base station and the small base station.

SUMMARY

In one general aspect, there is provided a communication method of a macro base station, the method including calculating an inter-cell nulling matrix that nulls an interference channel between the macro base station and a first pico terminal corresponding to a first pico base station based on a reception beamforming vector of the first pico terminal, and that nulls an interference channel between the macro base station and a second pico terminal corresponding to a second pico base station based on a reception beamforming vector of the second pico terminal, and calculating respective transmission beamforming vectors of macro terminals to remove interference that occurs among the macro terminals, using respective reception beamforming schemes of the macro terminals and the inter-cell nulling matrix.

The calculating of the respective transmission beamforming vectors of the macro terminals may comprise obtaining respective transmission beamforming vectors of the macro terminals using the inter-cell nulling matrix and serving channels of the macro terminals, and extracting the respective transmission beamforming vectors of the macro terminals, using the respective transmission beamforming vectors of the macro terminals and the inter-cell nulling matrix.

The method may further comprise scheduling macro terminals that do not receive interference from the first pico base station and the second pico base station.

The method may further comprise transmitting demodulation reference signals (DM-RSs) to the macro terminals using the respective transmission beamforming vectors of the macro terminals.

The method may further comprise calculating respective reception beamforming vectors of the macro terminals based on the respective transmission beamforming vectors of the macro terminals, and feed-forwarding the respective reception beamforming vectors of the macro terminals to the corresponding terminals.

The calculating may comprise calculating the respective reception beamforming vectors of the macro terminals using the respective transmission beamforming vectors of the macro terminals and serving channels of the macro terminals, when the respective reception beamforming schemes of the macro terminals are maximal ratio combining (MRC) schemes.

The method may further comprise transmitting a feed-forward indicator (FFI) indicating one of multiple modes associated with a method of transmitting information associated with the respective reception beamforming vectors of the macro terminals to the corresponding terminals.

The multiple modes may include at least two of a first mode to perform feed-forwarding of the respective reception beamforming vectors, a second mode to transmit information associated with a resource to which DM-RSs are to be transmitted, the DM-RSs being used for calculating the respective reception beamforming vectors, and to transmit, using the DM-RSs, information associated with serving channels that are based on the transmission beamforming vectors of the macro base station, and a third mode to transmit information associated with a resource to which DM-RSs that are orthogonal to each other are to be transmitted, the DM-RSs being used for calculating the reception beamforming vectors, and to transmit, using the DM-RSs, information associated with serving channels that are based on the transmission beamforming vectors of the macro base station.

The method may further comprise receiving, from the first pico terminal, information associated with the interference channel between the macro base station and the first pico terminal, and receiving, from the second pico terminal, information associated with the interference channel between the macro base station and the second pico terminal.

In another aspect, there is provided a communication method of a terminal, the method including receiving, from a base station, a feed-forward indicator (FFI) that indicates one mode from among multiple modes associated with a method of obtaining a reception beamforming vector of the terminal, obtaining, from the base station, information for determining the reception beamforming vector, based on a method corresponding to a mode indicated by the FFI, and determining the reception beamforming vector based on the obtained information.

The multiple modes may include at least two of a first mode to receive the reception beamforming vector, a second mode to obtain, using a demodulation reference signal (DM-RS), information associated with a serving channel that is based on a transmission beamforming vector of the base station, and to calculate the reception beamforming vector based on the information associated with the obtained serving channel, a third mode to receive DM-RSs that are orthogonal to each other, and to calculate the reception beamforming vector based on the obtained DM-RSs, and a fourth mode to determine the reception beamforming vector without using interference with a neighbor cell.

If the received FFI indicates the first mode, the obtaining of the information for determining the reception beamforming vector may comprise obtaining, from the base station, an index of a codebook associated with the reception beamforming vector.

If the received FFI indicates the second mode, the obtaining of the information for determining the reception beamforming vector may comprise receiving, from the base station, information associated with a resource to which the DM-RS is to be transmitted, and receiving the DM-RS based on the resource to which the DM-RS is to be transmitted.

If the received FFI indicates the third mode, the obtaining of the information for determining the reception beamforming vector may comprise receiving information associated with a resource to which DM-RSs that are orthogonal to each other are to be transmitted, and receiving the DM-RSs based on the resource to which the DM-RSs that are orthogonal to each other are to be transmitted.

In another aspect, the base station for reducing interference on a pico terminal that is served by a pico base station, the base station including a receiving unit for receiving channel information including a reception beamforming vector of the pico terminal, a beamforming determining unit for determining a transmission beamforming vector of one or more terminals served by the base station, to reduce interference on the pico terminal, and calculating a reception beamforming vector of the one or more terminals, based on the respective transmission beamforming vector of the one or more terminals, and a transmitting unit for transmitting, to the one or more terminals, a feed-forward indicator (FFI) indicating one of multiple modes associated with the method of transmitting information associated with the reception beamforming vector.

The FFI may indicate a first mode, and the transmitting unit may further transmit an index of a codebook corresponding to a reception beamforming vector to be used by the one or more terminals.

The FFI may indicate a second mode, and the transmitting unit may further transmit a demodulation reference signal (DM-RS) and information about a serving channel, which are to be used by the one or more terminals to calculate the reception beamforming vector.

In another aspect, there is provided a terminal served by a base station for reducing interference on a pico terminal that is served by a pico base station, the terminal including a receiving unit for receiving, from the base station, a feed-forward indicator (FFI) and information for obtaining a reception beamforming vector, wherein the FFI indicates one of a plurality of modes of obtaining the reception beamforming vector, and a determining unit for determining the reception beamforming vector based on the mode indicated by the FFI and the information for obtaining the reception beamforming vector.

The receiving unit may receive a FFI indicating a first mode, the information for obtaining the reception beamforming vector received from the base station may comprise an index of a codebook corresponding to the reception beamforming vector, and the determining unit may determine the reception beamforming vector based the FFI and the index of the codebook.

The receiving unit may receive a FFI indicating a second mode, the information for obtaining the reception beamforming vector received from the base station may comprise information associated with a resource to which a demodulation resource signal (DM-RS) is to be transmitted, the receiving unit may further receive the DM-RS from the base station based on the information associated with the resource, and the determining unit may determine the reception beamforming vector based on the FFI and the received DM-RS.

Other features and aspects may be apparent from the following detailed description, the drawings, and the claims.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Various aspects are directed towards a method of generating transmission beamforming vectors and reception beamforming vectors that show performance similar to a case in which full channel information is fed back. However, the method uses a smaller amount of feedback information associated with a channel in a hierarchical cell communication environment, It should be appreciated that the numbers of base stations, terminals, antennas, and the like may be greater or less than the numbers described in the examples herein. It should be appreciated that the conditions may be similar to an environment adopted by Next Generation Mobile Networks, such as Long Term Evolution (LTE)-advanced.

Figure 1:
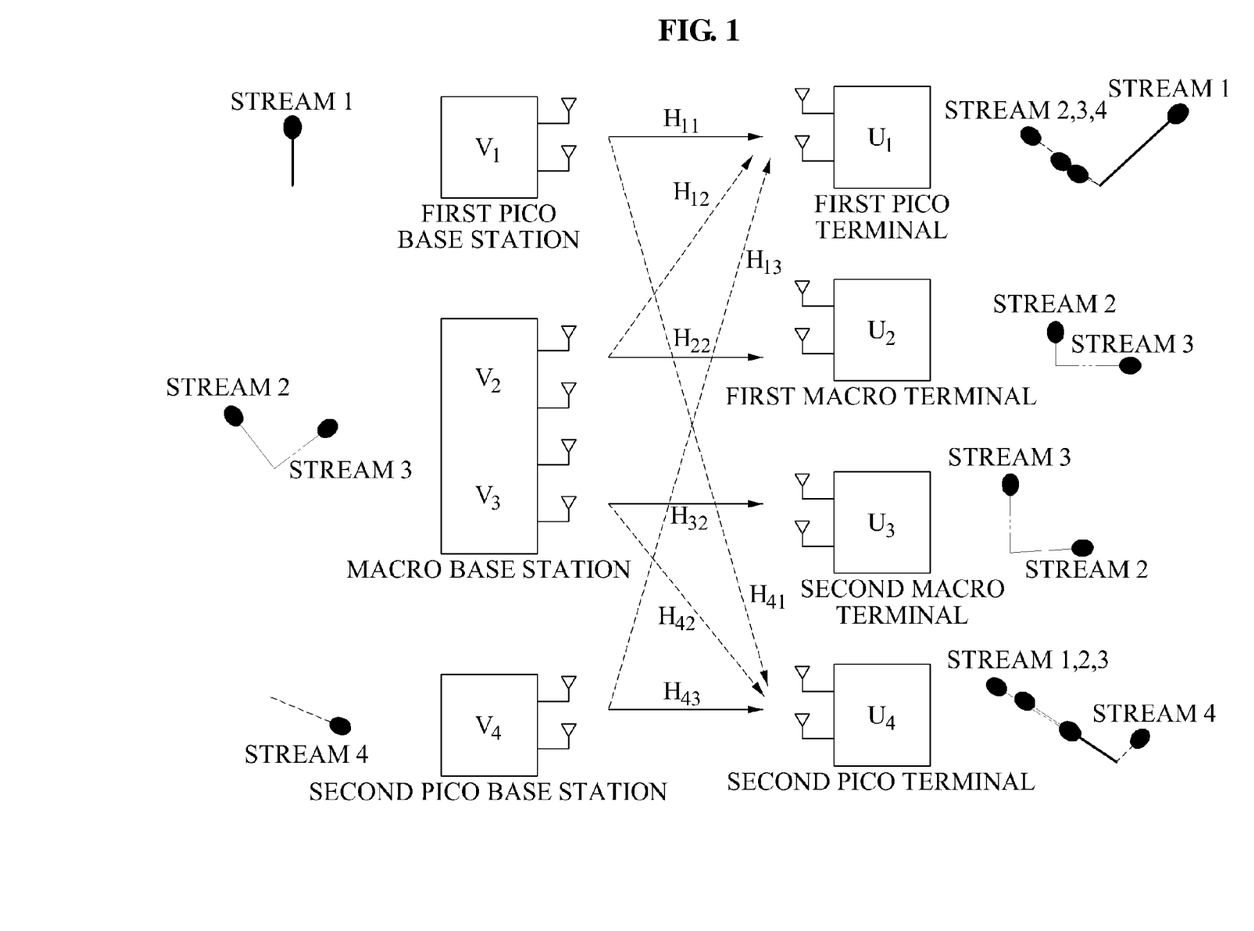
FIG. 1 is a diagram illustrating an example of a hierarchical cell communication system.

FIG. 1 illustrates an example of a hierarchical cell communication system.

Referring to FIG. 1, two small cells exist in a macro cell. For example, the macro cell may operate as a multi-user multiple-input multiple-output (MU-MIMO) communication system in which a macro base station simultaneously serves one or more macro terminals, such as a first macro terminal and a second macro terminal. The macro base station may include one or more antennas, for example, two antennas, four antennas, or more.

Two picocells may operate as a single-user multiple-input multiple-output (SU-MIMO) communication system in which pico base stations, such as a first pico base station and a second pico base station, serve respective pico terminals, such as a first pico terminal and a second pico terminal. Each pico base station may include one or more antennas, for example, two antennas. Generally, a picocell is produced at a relatively lower cost, and thus, the number of antennas of a pico base station may be smaller than the number of antennas of a macro base station. In various examples, a single terminal may be served to decrease a complexity of a system.

Each of terminals including macro terminals and pico terminals may have one or more antennas, for example, two antennas. Therefore, each terminal may have a two-dimensional (2D) signal space. When each of the terminals receives a single stream from a corresponding base station using one signal space, and aligns inter-cell interference and intra-cell interference using the other signal space, the terminals may receive respective single streams without error.

Although various examples are described using the picocell, the example embodiments may be applicable to other small cells.

A signal that is transmitted by each base station to a corresponding terminal is expressed by Equation 1.

$$x_i = \sqrt{p_i} v_i s_i.$$ [Equation 11]

In this example, i=1, 2, 3, and 4. Also, in this example i denotes an index of a terminal. A value of i of a first pico terminal, a value of i of a first macro terminal, a value of i of a second macro terminal, and a value of i of a second pico terminal correspond to 1, 2, 3, and 4, respectively. In this example, $s_i$ denotes a stream to be transmitted, $v_i$ denotes a transmission beamforming vector which is a unit norm vector, that is, $\|v_i\|_2=1$, and $p_i$ denotes a transmission power of a data stream.

A signal that is received by each terminal may be expressed by following equations. First, a signal $y_1^{pico}$ that is received by the first pico terminal is expressed by Equation 2.

$$y_1^{pico} = H_{11}\sqrt{p_1}\, v_1 s_1 + \underbrace{\sum_{j=2}^{3} H_{12}\sqrt{p_j}\, v_j s_j}_{\text{other-cell interference (Macro)}} + \underbrace{H_{13}\sqrt{p_4}\, v_4 s_4}_{\text{other-cell interference (Pico)}} + n_1.$$ [Equation 2]

A signal $y_2^{macro}$ that is received by the first macro terminal and a signal $y_3^{macro}$ that is received by the second macro terminal is expressed by Equation 3.

$$y_i^{marco} = H_{i2}\sqrt{p_i}\, v_i s_i + \underbrace{H_{i2}\sqrt{p_j}\, v_j s_j}_{\text{other-user interference (Macro)}} + n_i.$$ [Equation 3]

In Equation 3, i, j∈{2,3}, j≠i.

A signal $y_4^{pico}$ that is received by the second pico terminal is expressed by Equation 4.

$$y_4^{pico} = H_{43}\sqrt{p_4}\, v_4 s_4 + \underbrace{\sum_{j=2}^{3} H_{42}\sqrt{p_j}\, v_j s_j}_{\text{other-cell interference (Macro)}} + \underbrace{H_{41}\sqrt{p_1}\, v_1 s_1}_{\text{other-cell interference (Pico)}} + n_4.$$ [Equation 4]

In Equation 4, $H_{ij}$ denotes a channel matrix between a $j^{th}$ base station and an $i^{th}$ terminal, and $n_i$ is an additive white Gaussian noise (AWGN) added to the $i^{th}$ terminal. For example, each terminal may obtain an effective signal using a reception beamforming vector $u_i^H$ of the corresponding terminal.

An example of determining transmission beamforming vectors and reception beamforming vectors of a macro cell and picocells in a system mode of FIG. 1 is as follows.

First, the macro base station may determine macro terminals that do not receive interference from the picocells and schedule those macro terminals together with the picocells. A coordinated scheduling may be performed to allocate frequency resources to the macro terminal receiving relatively little interference from the picocells, and to allocate the same frequency resources to the picocells. Because the pico base stations are typically established in a shadow area or a hot zone area and their transmission power is limited, there may be a large amount of macro terminals that do not receive interference from the picocells.

the pico base stations and the macro base station may receive feedback of serving channel information and interference channel information. In this example, the serving channel information and the interference information may be used for generating respective transmission beamforming vectors. For example, the first pico base station and the second pico base station may receive a feedback of $H_{11}$, $H_{13}$, $H_{41}$, and $H_{43}$. As another example, the macro base station may receive a feedback of $H_{12}$, $H_{22}$, $H_{32}$, and $H_{42}$. As another example, the macro base station may receive a feedback of $u_1^H H_{12}$ and $u_4^H H_{42}$, instead of $H_{12}$ and $H_{42}$.

Third, the first pico base station and the second pico base station may determine a transmission beamforming vector of the first pico base station and a transmission beamforming vector of the second pico base station that reduces or nulls interference among picocells.

For example, the first pico terminal and the second pico terminal may use a maximum ratio combining (MRC) scheme as a reception beamforming scheme.

For example, the beamforming vectors of the first pico terminal and the second pico terminal for an MRC scheme is expressed by Equation 5.

$$u_1 = H_{11}v_1, u_4 = H_{43}v_4.$$ [Equation 5]

If reception beamforming vectors similar to Equation 5 are used, to null the interference from the second pico base station in the first pico terminal and to null the interference from the first pico base station in the second pico terminal, transmission beamforming vectors of the first pico base station and the second pico base station may satisfy Equation 6.

$$\begin{cases} (u_1)^H H_{13} v_4 = 0 \\ (u_4)^H H_{41} v_1 = 0 \end{cases} \Leftrightarrow \begin{cases} (H_{11}v_1)^H H_{13} v_4 = v_1^H H_{11}^H H_{13} v_4 = 0 \\ (H_{43}v_4)^H H_{41} v_1 = v_4^H H_{43}^H H_{41} v_1 = 0. \end{cases}$$ [Equation 6]

Referring to Equation 6, a relational expression of $(v_1)^\perp = \text{span}(H_{11}^H H_{13} v_4) = \text{span}(H_{41}^H H_{43} v_4)$ may be obtained. The relational expression may be summarized as shown in Equation 7.

$$\underbrace{H_{11}^H H_{13}}_{A} \underbrace{v_4}_{x} = \alpha \underbrace{H_{41}^H H_{43}}_{B} \underbrace{v_4}_{x} \Leftrightarrow Ax = \lambda Bx.$$ [Equation 7]

For example, a transmission beamforming vector $v_4$ of the second pico base station may be determined from Equation 7.

In this example, Equation 7 is based on Rayleigh-Ritz scheme, and is expressed by Equation 8.

$$(H_{41}^H H_{43})^{-1} H_{11}^H H_{13} v_4 = \alpha v_4$$

$$\therefore v_4 = \mathrm{eig}((H_{41}^H H_{43})^{-1} H_{11}^H H_{13}). \quad \text{[Equation 8]}$$

where eig(A) deontes an eigenvector of A

As another example, a transmission beamforming vector $v_1$ of the first pico base station may be determined from Equation 6 and from Equation 8, as expressed by Equation 9.

$$v_1 = \mathrm{null}(v_4^H H_{43}^H H_{41}) \quad \text{[Equation 9]}$$

where null(A) is the vector in null space of A with unit norm.

For example, the transmission beamforming vector $v_1$ of the first pico base station and the transmission beamforming vector $v_4$ of the second pico base station may be calculated by another entity instead of the first pico base station and the second pico base station, based on the described method.

Fourth, the macro base station may determine transmission beamforming vectors of the macro terminals, for example, transmission beamforming vectors of the macro base stations for the macro terminals. The macro base station may determine transmission beamforming vectors $v_2$ and $v_3$ of the macro terminals, based on the reception beamforming vectors of the first pico terminal and the second pico terminal. For example, the macro base station may determine the beamforming vectors to remove interference to the pico terminals (inter-cell interference) and interference among the macro terminals (the intra-cell interference).

As another example, the first macro terminal and the second macro terminal may use an MRC scheme as a reception beamforming scheme.

The transmission beamforming vectors $v_2$ and $v_3$ of the macro terminals may satisfy a condition of Equation 10 to perform nulling of both i) an effective interference channel between the macro base station and the first pico terminal by considering the reception beamforming vector of the first pico terminal, and ii) an interference channel between the macro base station and the second pico terminal by considering the reception beamforming vector of the second pico terminal $$v_i = H_{null} v_i^{\mathit{eff}} \quad \text{[Equation 10]}$$

where $i=\{2,3\}$, $H_{null}=\mathrm{null}([u_1^H H_{12} u_4^H H_{42}])$.

In Equation 10, $H_{null}$ is an inter-cell nulling matrix that removes or reduces the inter-cell interference, and $v_i^{\mathit{eff}}$ is a transmission beamforming effective vector that removes the intra-cell interference.

If the first macro terminal and the second macro terminal use the MRC scheme, for example, the transmission beamforming vectors $v_2$ and $v_3$ of the macro terminals may satisfy conditions of the following equations, and thus, may be capable of removing interference occurring among macro terminals.

$$u_2 = H_{22} v_2, \; u_3 = H_{32} v_3. \quad \text{[Equation 11]}$$

$$\begin{cases} (u_2)^H H_{22} v_3 = 0 \\ (u_3)^H H_{32} v_2 = 0 \end{cases} \Leftrightarrow \quad \text{[Equation 12]}$$

$$\begin{cases} (H_{22} v_2)^H H_{22} v_3 = v_2^{\mathit{eff},H} H_{null}^H H_{22}^H H_{22} H_{null} v_3^{\mathit{eff}} = 0 \\ (H_{32} v_3)^H H_{32} v_2 = v_3^{\mathit{eff},H} H_{null}^H H_{32}^H H_{32} H_{null} v_2^{\mathit{eff}} = 0. \end{cases}$$

If the first macro terminal and the second macro terminal use the MRC scheme, Equation 11 may be used as a relational expression between the reception beamforming vectors and transmission beamforming vectors. As another example, Equation 12 may be used as an equation for nulling the interference among the macro terminals.

An expansion of [Equation 12] is expressed by Equation 13.

$$(v_2^{\mathit{eff}})^{\perp} = \quad \text{[Equation 13]}$$

$$\mathrm{span}(H_{null}^H H_{22}^H H_{22} H_{null} v_3^{\mathit{eff}}) = \mathrm{span}(H_{null}^H H_{32}^H H_{32} H_{null} v_3^{\mathit{eff}})$$

$$\underbrace{H_{null}^H H_{22}^H H_{22} H_{null}}_{A} \underbrace{v_3^{\mathit{eff}}}_{x} = \underbrace{\alpha}_{\lambda} \underbrace{H_{null}^H H_{32}^H H_{32} H_{null}}_{B} \underbrace{v_3^{\mathit{eff}}}_{x}$$

$$\Leftrightarrow Ax = \lambda Bx.$$

A transmission beamforming effective vector $v_3^{\mathit{eff}}$ of the second macro terminal and a transmission beamforming vector $v_3$ may be determined from Equation 13, based on the Rayleigh-Ritz scheme, and is expressed by Equation 14.

$$H_{null}^H H_{22}^H H_{22} H_{null} v_3^{\mathit{eff}} = \alpha_{null}^H H_{32}^H H_{32} H_{null} v_3^{\mathit{eff}}$$

$$(H_{null}^H H_{32}^H H_{32} H_{null})^{-1} H_{null}^H H_{22}^H H_{22} H_{null} v_3^{\mathit{eff}} = \alpha v_3^{\mathit{eff}}$$

$$\therefore v_3^{\mathit{eff}} = \mathrm{eig}((H_{null}^H H_{32}^H H_{32} H_{null})^{-1} H_{null}^H H_{22}^H H_{22} H_{null}) \Leftrightarrow v_3 = H_{null} v_3^{\mathit{eff}}. \quad \text{[Equation 14]}$$

where eig(A) deontes an eigenvector of A

For example, a transmission beamforming effective vector $v_2^{\mathit{eff}}$ and a transmission beamforming vector $v_2$ of the second macro terminal may be determined from Equation 12 and Equation 14, and is expressed by Equation 15.

$$v_2^{\mathit{eff}} = \mathrm{null}(v_3^{\mathit{eff},H} H_{null}^H H_{32} H_{null}) \Leftrightarrow v_2 = H_{null} v_2^{\mathit{eff}}. \quad \text{[Equation 15]}$$

where null(A) is the vector in null space of A with unit norm

The transmission beamforming vectors $v_2$ and $v_3$ may be calculated by another entity instead of the macro base station, based on the described method.

Fifth, the macro base station and the pico base stations may each transmit information that is associated with a reception beamforming vector of a corresponding terminal to the corresponding terminal.

For example, the macro base station may transmit demodulation reference signals (DM-RSs) to macro terminals, using the determined transmission beamforming vectors of the macro terminals. As another example, the pico base stations may transmit DM-RSs to corresponding pico terminals, using respective transmission beamforming vectors of the pico base stations.

In this example, the pico terminals and the macro terminals may receive the DM-RSs, and obtain information associated with effective serving channels that are based on the transmission beamforming vectors. For example, the pico terminals and the macro terminals may obtain reception beamforming vectors by normalizing information that is associated with the effective serving channels as illustrated in Equation 16.

$$u_1 = \frac{H_{11} v_1}{\|H_{11} v_1\|}, \; u_2 = \frac{H_{22} v_2}{\|H_{22} v_2\|}, \quad \text{[Equation 16]}$$

$$u_3 = \frac{H_{32} v_3}{\|H_{32} v_3\|}, \; u_4 = \frac{H_{43} v_4}{\|H_{43} v_4\|}.$$

Using DM-RSs, the pico base stations and the macro base station may not directly feed-forward the reception beamforming vectors but instead may feed-forward information to be used by a terminal to determine the reception beamforming vector. Therefore, a transmission capacity may increase.

In a communication system that does not use a DM-RS, for example, the pico base stations and the macro base station may feed-forward respective reception beamforming vectors of corresponding terminals. For example, the macro base station may calculate the reception beamforming vectors of the macro terminals based at least one of the transmission beamforming vectors of the macro terminals and serving channels of the macro terminals. The macro base station may feed-forward an index of a codebook that is associated with each reception beamforming vector. As another example, the pico base station may also feed-forward an index of a codebook associated with a reception beamforming vector, in the same manner.

Figure 2:
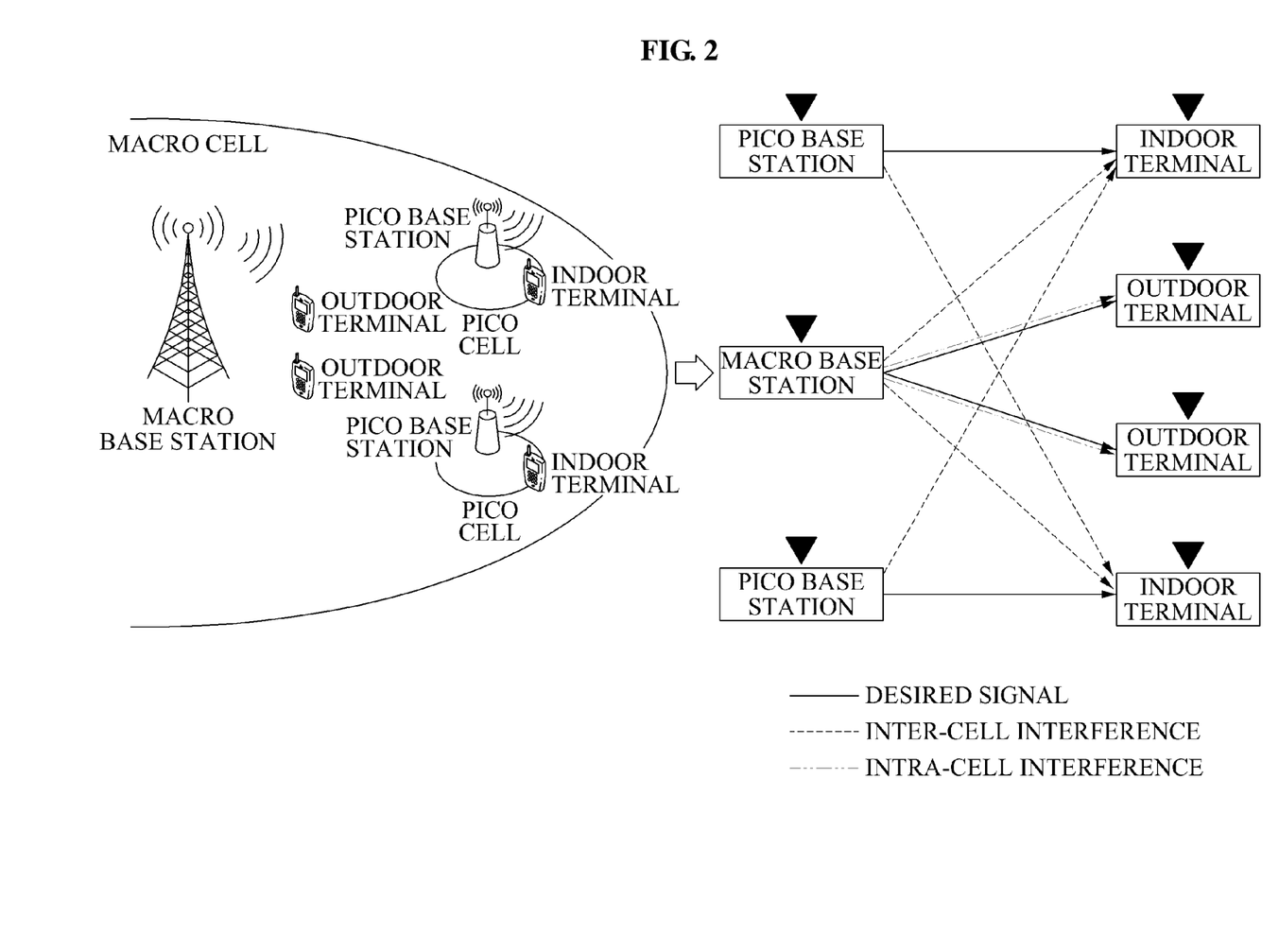
FIG. 2 is a diagram illustrating an example of a hierarchical cell communication system in which a transmission beamforming vector and a reception beamforming vector are determined.

FIG. 2 illustrates an example of a hierarchical cell communication system in which a transmission beamforming vector and a reception beamforming vector are determined.

Referring to FIG. 2, in this example two picocells exist in a macro cell. For example, a macro base station may serve terminals located outdoors. As another example, a pico base station in a picocell may serve terminals located indoors. To reduce inter-cell interference and intra-cell interference as shown in FIG. 2, transmission beamforming vectors of the macro base station and each pico base station and reception beamforming vectors of each outdoor terminal and each indoor terminal may be determined.

Figure 3:
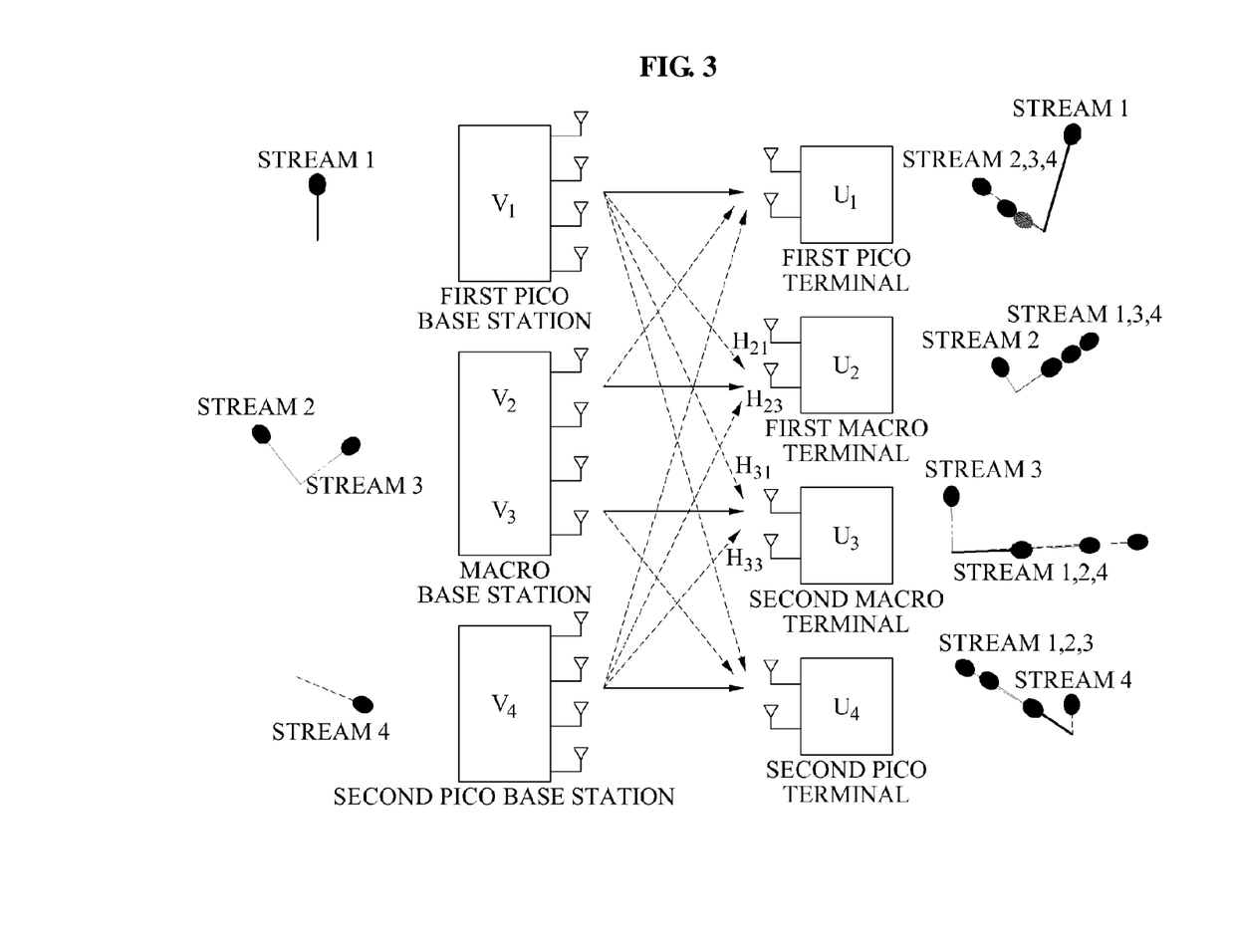
FIG. 3 is a diagram illustrating a hierarchical cell communication system including a fully connected interference channel in which a transmission beamforming vector and a reception beamforming vector are determined.

FIG. 3 illustrates a hierarchical cell communication system including a fully connected interference channel in which a transmission beamforming vector and a reception beamforming vector are determined.

In the example of the hierarchical cell communication system of FIG. 3, unlike the hierarchical cell communication system of FIG. 1, interference to macro terminals from pico base stations exists. A method of determining transmission beamforming vectors and reception beamforming vectors and a method of transmitting information associated with a reception beamforming vector may be applied to a hierarchical cell communication system including a fully connected interference channel, such as the hierarchical cell communication system of FIG. 3.

First, the reception beamforming vectors $u_1$ and $u_4$ of the first pico terminal and the second pico terminal may be determined. In this example, reception beamforming vectors $u_1$ and $u_4$ may be arbitrarily determined by the macro base station, a pico base station, or another entity.

For example, the macro base station may calculate the transmission beamforming vectors $v_2$ and $v_3$ of the macro terminals using the determined $u_1$ and $u_4$, based on a method that is similar to the method using Equations 10 through Equation 15.

For example, the first pico base station and the second pico base station may calculate the corresponding transmission beamforming vectors $v_1$ and $v_4$, as expressed by Equation 17 and Equation 18.

$$v_1 = \text{null}([u_2^H H_{21} u_3^H H_{31} u_4^H H_{41}]).$$ [Equation 17]

$$v_4 = \text{null}([u_1^H H_{13} u_2^H H_{23} u_3^H H_{33}]).$$ [Equation 18]

In Equation 17 and Equation 18, $u_2$ and $u_3$ may be obtained based on $v_2$ and $v_3$.

In this example, the macro terminals may obtain reception beamforming vectors by receiving DM-RSs without performing separate feed-forwarding, because the macro terminals use an MRC scheme. The first pico terminal and the second pico terminal may respectively receive reception beamforming vectors that are feed-forwarded from the first pico base station and the second pico base station.

In various aspects, the method of transmitting the information associated with a reception beamforming vector may be different. Accordingly, a base station may transmit, to a terminal, a feed-forward indicator (FFI) indicating one of multiple modes associated with the method of transmitting information associated with the reception beamforming vector. For example, the base station may transmit the information associated with the reception beamforming vector based on a method corresponding to a mode indicated by the FFI, to the terminal. This approach accommodates the possibility that the method of transmitting the information associated with the reception beamforming vector may be changed based on whether the terminal is able to perform reception beamforming according to an interference channel situation using the MRC scheme.

For example, in a first mode, the base station may feed forward the reception beamforming vector.

In a second mode, the base station may transmit information associated with a resource to which a DM-RS is to be transmitted. In this example, the DM-RS may be used for calculating the reception beamforming vector. The base station may also transmit, using the DM-RS, information associated with an effective serving channel that is based on the transmission beamforming vector of the base station. In the second mode, the terminal may calculate the reception beamforming vector based on the received DM-RS.

In a third mode, the base station may transmit information associated with a resource to which DM-RSs are to be transmitted. For example, the DM-RSs may be orthogonal to each other for each cell and may be used for calculating the reception beamforming vector. The base station may transmit, using the DM-RSs, information associated with effective serving channels that are based on the transmission beamforming vectors of the base station. As another example, the base station may transmit, to the terminal, information that is associated with a resource to which DM-RSs associated with neighbor base stations are to be transmitted, in addition to the information that is associated with a resource to which a DM-RS of the base station is to be transmitted.

The terminal may receive DM-RSs from the base station and the neighbor base stations. The terminal may estimate effective interference channels based on transmission beamforming vectors of the neighbor base stations. The terminal may determine the reception beamforming vector to null the effective interference channels that are based on the transmission beamforming vectors of the neighbor base stations. The terminal may determine the reception beamforming vector based on the received DM-RSs.

In a fourth mode, the terminal may determine the reception beamforming vector without using the inter-cell interference.

Referring to FIG. 3, for example, the macro base station and the macro terminals may operate in the second mode and the pico base stations and the pico terminals may operate in the first mode.

Figure 4:
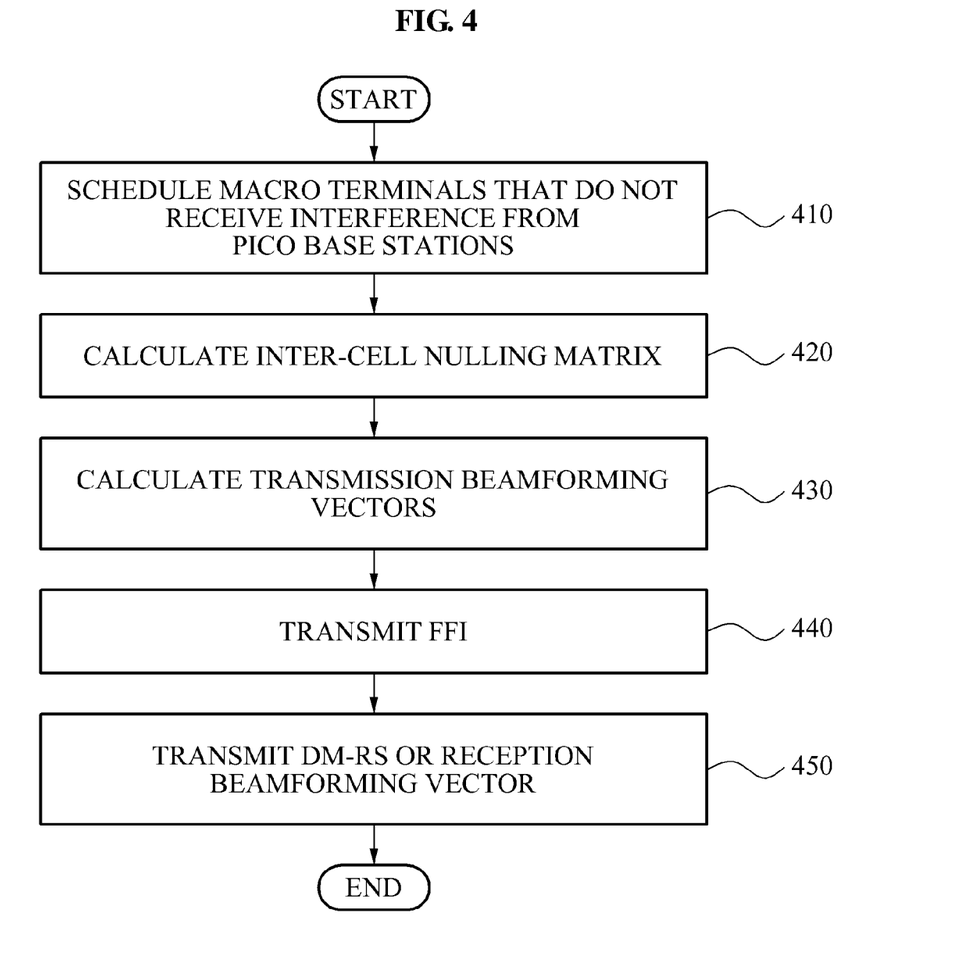
FIG. 4 is a flowchart illustrating an example of a communication method of a macro base station.

FIG. 4 illustrates an example of a communication method of a macro base station.

Referring to FIG. 4, the macro base station schedules macro terminals that do not receive interference from pico base stations, in 410.

In 420, the macro base station calculates an inter-cell nulling matrix that may be used to null an effective interference channel between the macro base station and a first pico terminal corresponding to a first pico base station. For example, the effective interference channel may be based on a reception beamforming vector of the first pico terminal. In addition, the inter-cell nulling matrix may be used to null an effective interference channel between the macro base station and a second pico terminal corresponding to a second pico base station. For example, the effective interference channel may be based on a reception beamforming vector of the second pico terminal.

In 430, the macro base station calculates respective transmission beamforming vectors of the macro terminals, to remove interference that occurs among the macro terminals, using respective reception beamforming schemes of the macro terminals and the inter-cell nulling matrix. For example, the macro base station may obtain respective transmission beamforming effective vectors of the macro terminals using the inter-cell nulling matrix and the serving channels of the macro terminals, and may extract respective transmission beamforming vectors of the macro terminals using the respective transmission beamforming effective vectors of the macro terminals and the inter-cell nulling matrix.

In 440, the macro base station transmits an FFI of each macro terminal to a corresponding macro terminal. The FFI may be determined based on the macro base station.

In 450, the macro base station transmits DM-RSs or the reception beamforming vectors to macro terminals, based on the FFI.

Figure 5:
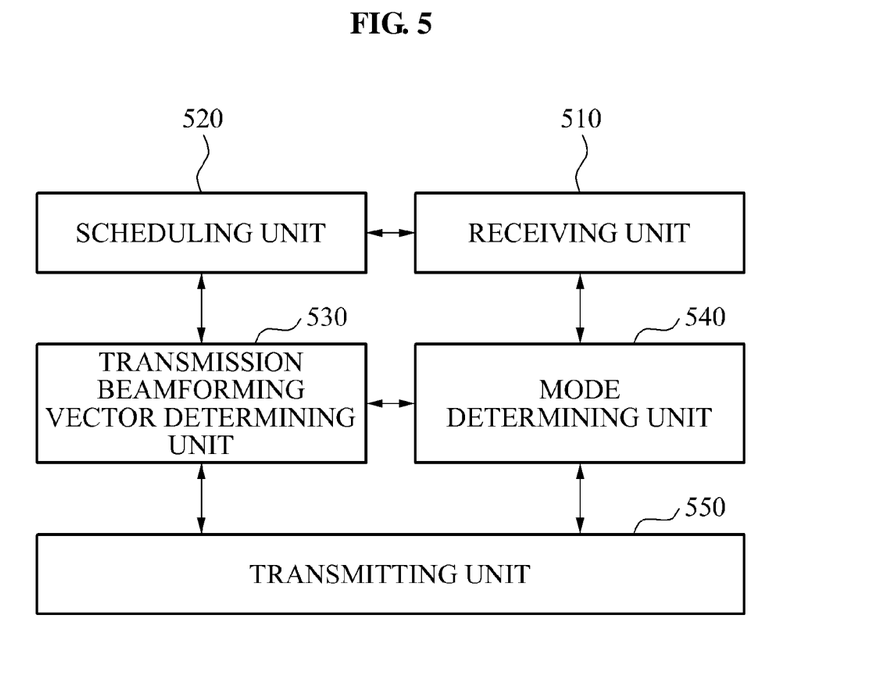
FIG. 5 is a diagram illustrating an example of a macro base station.

FIG. 5 illustrates an example of a macro base station.

Referring to FIG. 5, the macro base station includes a receiving unit 510, a scheduling unit 520, a transmission beamforming vector determining unit 530, a mode determining unit 540, and a transmitting unit 550.

The receiving unit 510 may receive various channel information and information to be used for calculating a transmission beamforming vector. For example, the receiving unit may receive channel information including a reception beamforming vector of the pico terminal The scheduling unit 520 may schedule macro terminals that do not receive interference from pico base stations.

The transmission beamforming vector determining unit 530 (or beamforming determining unit 530) may determine, based on the reception beamforming vectors of the pico terminals, transmission beamforming vectors of the macro terminals to remove interference to the pico terminals that is caused by inter-cell interference, and to remove interference from among the macro terminals that is caused by intra-cell interference.

The mode determining unit 540 may select one of the multiple modes associated with a method of transmitting information associated with a reception beamforming vector to a terminal. The mode determining unit 540 may transmit an FFI corresponding to the selected mode to the transmitting unit 550.

The transmitting unit 550 may transmit information associated with reception beamforming vectors based on FFIs and modes corresponding to the FFIs, to the macro terminals.

Figure 6:
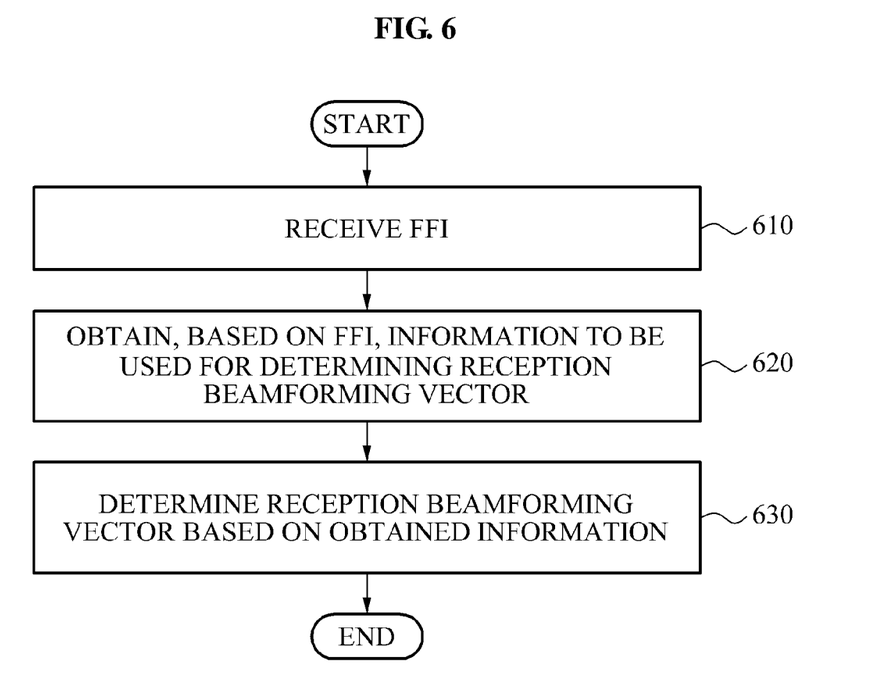
FIG. 6 is a flowchart illustrating an example of a communication method of a terminal using a feed-forward indicator (FFI).

FIG. 6 illustrates an example of a communication method of a terminal using an FFI. The communication method of FIG. 6 may be applicable to a macro terminal and a pico terminal.

Referring to FIG. 6, the terminal corresponding to a base station receives, from the base station, an FFI indicating one of multiple modes associated with a method of obtaining a reception beamforming vector of the terminal, in 610.

For example, the multiple modes may include a first mode to receive a feed-forwarded reception beamforming vector, a second mode to obtain, using a DM-RS, information associated with an effective serving channel that is based on a transmission beamforming vector of the base station, and to calculate the reception beamforming vector based on the information associated with the obtained effective serving channel, a third mode to receive DM-RSs that are orthogonal to each other for each cell, and to calculate the reception beamforming vector based on the obtained DM-RSs, and a fourth mode to determine the reception beamforming vector without considering interference with a neighbor cell.

The terminal obtains, from the base station, information to use for determining the reception beamforming vector, based on a mode indicated by the received FFI, in 620. For example, in the first mode, the terminal may receive an index of a codebook associated with the reception beamforming vector. In the second mode, the terminal may receive information that is associated with a resource to which the DM-RS is to be transmitted, and may receive the DM-RS based on the resource. In the third mode, the terminal may receive information that is associated with a resource to which DM-RSs that are orthogonal to each other are to be transmitted, and may receive the DM-RSs of cells based on the resource.

The terminal determines the reception beamforming vector based on the obtained information, in 630. As an example, the reception beamforming vector may be determined based on the DM-RS or based on the index of the codebook that is associated with the reception beamforming vector. As another example, in the fourth mode, the terminal may determine the reception beamforming vector based on the serving channel information.

Figure 7:
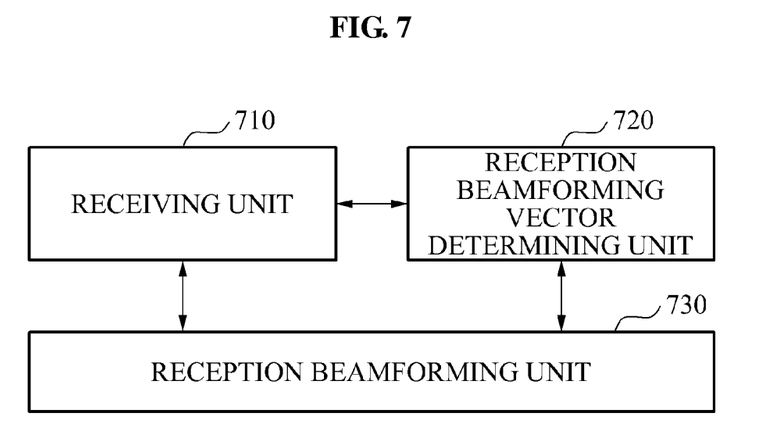
FIG. 7 is a diagram illustrating an example of a terminal.

FIG. 7 illustrates an example of a terminal. In this example, the terminal may be a macro terminal or a pico terminal.

Referring to FIG. 7, the terminal includes a receiving unit 710, a receiving beamforming vector determining unit 720, and a reception beamforming unit 730.

The receiving unit 710 may receive data from the base station. For example, the receiving unit 710 may receive an FFI, a DM-RS, an index of a codebook associated with a reception beamforming vector, and the like.

The reception beamforming vector determining unit 720 (or determining unit 720) may determine the reception beamforming vector based on the FFI received by the receiving unit 710. For example, if the receiving unit 710 receives a FFI indicating a first mode, and the information for obtaining the reception beamforming vector received from the base station comprises an index of a codebook corresponding to the reception beamforming vector, the determining unit may determine the reception beamforming vector based the FFI and the index of the codebook.

As another example, if the receiving unit 710 receives a FFI indicating a second mode, and the information for obtaining the reception beamforming vector received from the base station comprises information associated with a resource to which a demodulation resource signal (DM-RS) is to be transmitted, the receiving unit 710 may further receive the DM-RS from the base station based on the information associated with the resource. In addition, the determining unit 720 may determine the reception beamforming vector based on the FFI and the received DM-RS.

The reception beamforming unit 730 may perform reception beamforming with respect to a signal that is transmitted from the base station, using the reception beamforming vector that is determined by the reception beamforming vector determining unit 720.

In various aspects, a communication method of a macro base station and a terminal as well as corresponding macro base station and terminal are described. The described methods, the macro base station, and terminal may be applicable to the examples described with reference to FIGS. 1 through 3 as well as other embodiments.

The processes, functions, methods, and/or software described herein may be recorded, stored, or fixed in one or more computer-readable storage media including program instructions to implement various operations embodied by a computer. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations of the above-described example embodiments, or vice versa. In addition, a non-transitory computer-readable storage medium may be distributed among computer systems connected through a network and non-transitory computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a macro base station, the method comprising:
    calculating, at the macro base station, an inter-cell nulling matrix that nulls an interference channel between the macro base station and a first pico terminal corresponding to a first pico base station based on a reception beamforming vector of the first pico terminal, and that nulls an interference channel between the macro base station and a second pico terminal corresponding to a second pico base station based on a reception beamforming vector of the second pico terminal; and
    calculating, at the macro base station, respective transmission beamforming vectors of macro terminals to remove interference that occurs among the macro terminals, using respective reception beamforming schemes of the macro terminals and the inter-cell nulling matrix.

2. The method of claim 1, wherein the calculating of the respective transmission beamforming vectors of the macro terminals comprises:
    obtaining respective transmission beamforming vectors of the macro terminals using the inter-cell nulling matrix and serving channels of the macro terminals; and
    extracting the respective transmission beamforming vectors of the macro terminals, using the respective transmission beamforming vectors of the macro terminals and the inter-cell nulling matrix.

3. The method of claim 1, further comprising:
    scheduling macro terminals that do not receive interference from the first pico base station and the second pico base station.

4. The method of claim 1, further comprising:
    transmitting demodulation reference signals (DM-RSs) to the macro terminals using the respective transmission beamforming vectors of the macro terminals.

5. The method of claim 1, further comprising:
    calculating respective reception beamforming vectors of the macro terminals based on the respective transmission beamforming vectors of the macro terminals; and
    feed-forwarding the respective reception beamforming vectors of the macro terminals to the corresponding terminals.

6. The method of claim 5, wherein the calculating comprises:
    calculating the respective reception beamforming vectors of the macro terminals using the respective transmission beamforming vectors of the macro terminals and serving channels of the macro terminals, when the respective reception beamforming schemes of the macro terminals are maximal ratio combining (MRC) schemes.

7. The method of claim 1, further comprising:
    transmitting a feed-forward indicator (FFI) indicating one of multiple modes associated with a method of transmitting information associated with the respective transmission beamforming vectors of the macro terminals to the corresponding terminals.

8. The method of claim 7, wherein the multiple modes include at least two of:
    a first mode to perform feed-forwarding of the respective reception beamforming vectors;
    a second mode to transmit information associated with a resource to which DM-RSs are to be transmitted, the DM-RSs being used for calculating the respective reception beamforming vectors, and to transmit, using the DM-RSs, information associated with serving channels that are based on the transmission beamforming vectors of the macro base station; and a third mode to transmit information associated with a resource to which DM-RSs that are orthogonal to each other are to be transmitted, the DM-RSs being used for calculating the reception beamforming vectors, and to transmit, using the DM-RSs, information associated with serving channels that are based on the transmission beamforming vectors of the macro base station.

9. The method of claim 1, further comprising:

receiving, from the first pico terminal, information associated with the interference channel between the macro base station and the first pico terminal, and receiving, from the second pico terminal, information associated with the interference channel between the macro base station and the second pico terminal.

10. A communication method of a terminal, the method comprising:

receiving, from a base station, a feed-forward indicator (FFI) that indicates one mode from among multiple modes associated with a method of obtaining a reception beamforming vector of the terminal;

obtaining, from the base station, information for determining the reception beamforming vector, based on a method corresponding to a mode indicated by the FFI; and determining the reception beamforming vector based on the obtained information, wherein the multiple modes include at least one of:

a first mode to receive the reception beamforming vector, a second mode to obtain, using a demodulation reference signal(DM-RS), information associated with a serving channel that is based on a transmission beamforming vector of the base station, and to calculate the reception beamforming vector based on the information associated with the obtained serving channel, and a third mode to receive DM-RSs that are orthogonal to each other, and to calculate the reception beamforming vector based on the obtained DM-RSs.

11. The method of claim 10, wherein, when the received FFI indicates the first mode, the obtaining of the information for determining the reception beamforming vector comprises:

obtaining, from the base station, an index of a codebook associated with the reception beamforming vector.

12. The method of claim 10, wherein, when the received FFI indicates the second mode, the obtaining of the information for determining the reception beamforming vector comprises:

receiving, from the base station, information associated with a resource to which the DM-RS is to be transmitted; and receiving the DM-RS based on the resource to which the DM-RS is to be transmitted.

13. The method of claim 10, wherein, when the received FFI indicates the third mode, the obtaining of the information for determining the reception beamforming vector comprises:

receiving information associated with a resource to which DM-RSs that are orthogonal to each other are to be transmitted; and receiving the DM-RSs based on the resource to which the DM-RSs that are orthogonal to each other are to be transmitted.

14. A base station to reduce interference on a pico terminal that is served by a pico base station, the base station comprising:

a receiving unit configured to receive channel information, including a reception beamforming vector of the pico terminal;

a beamforming determining unit configured to determine a transmission beamforming vector of one or more terminals served by the base station, to reduce interference on the pico terminal, and to calculate a reception beamforming vector of the one or more terminals, based on the respective transmission beamforming vector of the one or more terminals; and a transmitting unit configured to transmit, to the one or more terminals, a feed-forward indicator (FFI) indicating one of multiple modes of transmitting information associated with the reception beamforming vector.

15. The base station of claim 14, wherein the FFI indicates a first mode, and the transmitting unit further transmits an index of a codebook corresponding to a reception beamforming vector to be used by the one or more terminals.

16. The base station of claim 14, wherein the FFI indicates a second mode, and the transmitting unit further transmits a demodulation reference signal (DM-RS) and information about a serving channel, which are to be used by the one or more terminals to calculate the reception beamforming vector.

17. A terminal served by a base station to reduce interference, the terminal comprising;

a receiving unit configured to receive, from the base station, a feed-forward indicator (FFI) and information for obtaining a reception beamforming vector, wherein the FFI indicates one of a plurality of modes of obtaining the reception beamforming vector; and a determining unit configured to determine the reception beamforming vector based on the mode indicated by the FFI and the information for obtaining the reception beamforming vector, wherein:

the receiving unit is further configured to receive the FFI indicating a second mode, and the information for obtaining the reception beamforming vector received from the base station comprises information associated with a resource to which a demodulation resource signal (DM-RS) is to be transmitted, the receiving unit is further configured to receive the DM-RS from the base station based on the information associated with the resource, and the determining unit is further configured to determine the reception beamforming vector based on the FR and the received DM-RS.

18. The terminal of claim 17, wherein the receiving unit receives a FFI indicating a first mode, the information for obtaining the reception beamforming vector received from the base station comprises an index of a codebook corresponding to the reception beamforming vector, and the determining unit determines the reception beamforming vector based the FFI and the index of the codebook.

* * * * *